(12) United States Patent
Siegel et al.

(10) Patent No.: US 6,553,321 B2
(45) Date of Patent: *Apr. 22, 2003

(54) INTELLIGENT ASSEMBLY SYSTEMS AND METHODS

(75) Inventors: Robert P. Siegel, Penfield, NY (US); Stephen C. O'Leyar, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/682,361

(22) Filed: Aug. 24, 2001

(65) Prior Publication Data

US 2003/0040871 A1 Feb. 27, 2003

(51) Int. Cl.$^7$ .............................................. G06E 19/00
(52) U.S. Cl. ....................................... 702/33; 29/898.09
(58) Field of Search ......................... 29/898.09, 407.08, 29/712; 395/600; 364/468.01; 702/33; 173/183; 707/10; 324/228

(56) References Cited

U.S. PATENT DOCUMENTS

| | | | |
|---|---|---|---|
| 106,801 A | | 8/1870 | Siegel |
| 4,361,945 A | * | 12/1982 | Eshghy ...................... 173/183 |
| 5,034,690 A | * | 7/1991 | Taliaferro .................... 324/228 |
| 5,089,970 A | | 2/1992 | Lee et al. |
| 5,311,438 A | | 5/1994 | Sellers et al. |
| 5,396,703 A | * | 3/1995 | Rice ......................... 29/407.08 |
| 5,548,756 A | * | 8/1996 | Tantry et al. .................. 707/10 |
| 5,910,894 A | | 6/1999 | Pryor |
| 5,917,726 A | * | 6/1999 | Pryor ........................... 29/712 |
| 6,111,601 A | * | 8/2000 | Adachi ......................... 348/92 |
| 6,202,981 B1 | * | 3/2001 | Davis et al. ................. 251/143 |

* cited by examiner

*Primary Examiner*—John Barlow
*Assistant Examiner*—Xiuqin Sun
(74) *Attorney, Agent, or Firm*—Oliff & Berridge, PLC

(57) ABSTRACT

An intelligent assembly system for a manufacturing process using one or more sensors that provide information for controlling, monitoring and/or evaluating the process. One or more sensors may be mounted on a module assembly and/or on a powered tool device. The one or more sensors may sense a vibratory signature and/or electrical current during the process and supply information, such as a data signal, to a software program or other processor for processing. For example, using a database of stored data regarding vibratory signatures and/or electrical currents for one or more power tool devices used in the manufacturing process, the information may be compared and analyzed to determine if it is within a specified range. Results of such analysis may be transmitted to an operator and/or graphically displayed. The results and/or display may instruct the operator to continue with the manufacturing process or inspect the process step just completed for possible error.

12 Claims, 9 Drawing Sheets

INTELLIGENT ASSEMBLY SYSTEMS AND METHODS

BACKGROUND OF THE INVENTION

1. Field of Invention

This invention relates to intelligent assembly systems and methods for use in manufacturing processes.

2. Description of Related Art

Over the years, manufacturing processes have become more automated. Where repeated procedures are required, such as welding, machining or riveting, the use of automation has enhanced productivity and improved quality control by greatly reducing human error in the manufacturing process. However, in many cases, manual control is often necessary to initiate and/or terminate a process or to change out tooling and/or equipment.

Standardization of repeat operations is a primary feature of automation, though automation of manufacturing processes may take many forms and can be done at almost any phase of the process, from fabrication to inspection and packaging of a completed product. In true automation, the process or step being automated involves a sensing system for making decisions about the device or process and then a control system that reacts to the sensed information and provides control reaction. U.S. Pat. Nos. 5,910,894 and 5,917,726 to Pryor, for example, describe intelligent tools for assembly and machining through the use of sensing devices. The tools provide information with regard to part location, machining, detail location, and automation.

Manufacturing systems are also becoming more integrated. Workers involved in the manufacturing process, by controlling and operating the machinery on the shop floor, are gaining greater efficiencies through "smarter" shop floor control systems. U.S. Pat. No. 5,311,438 to Sellers et al, for example, describes integration of multiple systems in the manufacturing process which improves communication and automation. Likewise, U.S. Pat. No. 5,089,970 to Lee et al. describes the distribution of information throughout the factory to facilitate the manufacturing of products.

Still, new processes are needed to further reduce errors during assembly and provide greater efficiencies through the use of smart systems.

SUMMARY OF THE INVENTION

This invention provides an intelligent assembly system that controls, monitors, and/or evaluates a manufacturing process.

This invention separately and independently provides one or more sensors mounted on a module assembly.

This invention separately and independently provides one or more sensors be mounted on a power tool device.

This invention separately and independently provides a power tool device used for fasteners during assembly processes of manufacturing.

This invention separately and independently provides that a control system be used that receives information from one or more sensors and processes the data.

This invention separately and independently provides an operating system that receives information from the control system and controls the power tool device.

This invention separately and independently provides a database of parameters associated with the fasteners and the power tool device used during assembly processes.

This invention provides an element of automation for assembly processes based upon vibratory signatures and/or performance parameters of a power tool device.

According to various embodiments of this invention, one or more sensors are attached to and integrated with a module so that readings of the assembly process are provided. Further, according to various embodiments of this invention, one or more sensors are attached to and integrated with a power tool device used to insert/attach fasteners to a module assembly so that readings of the assembly are provided. The sensor or sensors may be interfaced with a network or otherwise arranged to transmit sensed signals to a control system.

According to various embodiments of this invention, the control system includes a signal-processing interface. The interface may include software that essentially watches the assembly process, looking out for specific events, such as the insertion of a screw, snap fit, and the like. These events can be counted to ensure that the correct number of insertions are made. In addition, a quantitative analysis can be done to assess whether these operations have been performed correctly. An output of the analysis results can be provided to the control system operator by a graphical user interface (GUI) or some other notification means or device.

According to various embodiments of this invention, results of the control system analysis are transmitted to the operator and displayed by a light, an audible tone, a computerized voice, a GUI or the like that indicates the results of the assembly process. If a defect is detected by the control system analysis, the operator can be notified and the operator may initiate an inspection of the assembled module for such defects.

In various embodiments of this invention, the operator is provided with information for each subassembly process during the assembly process. Alternately or additionally, the operator may be provided with information such as the quality of the attachment of the subassembly. In various embodiments of this invention, the operator is provided with information on each fastener as it is completed. Alternately or additionally, the operator may be provided with information such as the number and/or length of the fasteners used/inserted once the module assembly is completed. After the operator is satisfied with the assembly processes, the system can be reset as assembly of the next module is initiated.

Although the intelligent assembly systems and methods of this invention may be utilized as part of a factory shop floor control system, this invention may be embodied in a self-contained, portable system using sensor(s), control system(s), and operating system(s).

These and other features and advantages of this system are described in or are apparent from the following detailed description of exemplary embodiments.

BRIEF DESCRIPTION OF THE DRAWINGS

Various exemplary embodiments of this invention will be described in detail with reference to the following figures, wherein:

FIG. 10 is a perspective view of an intelligent power tool device according to a third exemplary embodiment of this invention.

DETAILED DESCRIPTION OF PREFERRED EMBODIMENTS

In various exemplary embodiments of the systems and methods of this invention, a sensing system comprises an assembly process that provides feedback to an operator. A control system is used to process the information from the sensing system. The control system receives sensed data from the assembly process, processes and analyzes the data, and, in turn, transmits a signal to the operator who determines the result of the assembly process. The control system may also have a provision to accept input from the operator specifying what type of fastener is being used. For example, for a screw, the operator may define the fastener precisely in terms of the number of threads per inch or approximately with a fine-medium-coarse selection.

In various exemplary embodiments, the sensor comprises a device that enables sensing of signature characteristics, for example, vibratory signatures, during the assembly process. The location and number of sensors needed may be predicated on the type of module under assembly, the type of power tool device to be used, and/or the type of fastener used. For example, a module assembly with multiple subcomponents attached to the module during assembly may require sensors situated on various locations of the module frame. Also, sensed data for a fastener such as a screw may be observed during insertion by one or more sensors on a power screw gun. On the other hand, sensed data for fasteners such as snap fits may be gathered from one or more sensors situated on the assembly module.

The type of control and operating systems employed in this invention may vary based on the manufacturing facility used. It should be appreciated that systems may differ, for example, depending on whether the assembly module is in an automotive facility or a computer facility.

Figure 1:
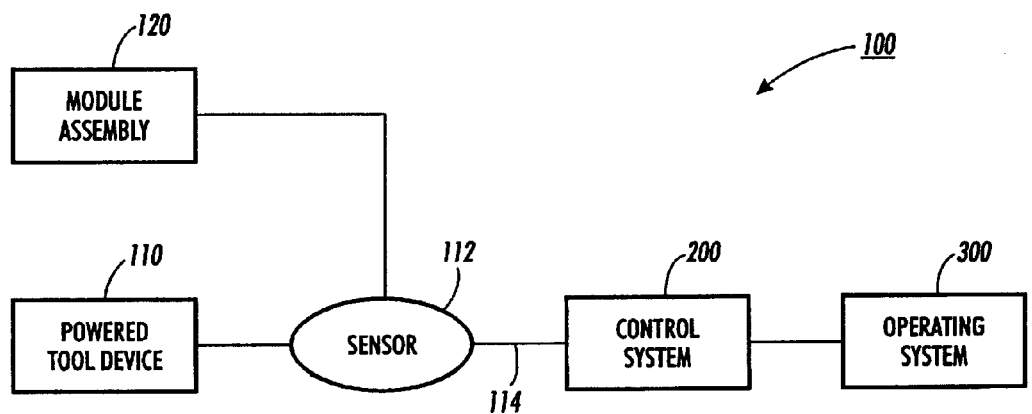
FIG. 1 is an exemplary block diagram of an assembly system according to this invention that provides information for controlling, monitoring and/or evaluating a manufacturing process.

FIG. 1 shows a block diagram representing an exemplary embodiment of an intelligent assembly system 100 according to this invention. As shown, the intelligent assembly system 100 includes a powered tool device 110 and/or a module assembly 120, integrated with a sensor device 112, a control system 200, and an operating system 300. It should be understood that the power tool system 100, as depicted in FIG. 1, may be integrated into a shop floor of a factory where the assembly processes or other manufacturing processes take place, or may comprise a portable apparatus for use in locations away from the infrastructure of a factory.

The elements of the intelligent assembly system 100 are connected using a network that may be implemented as a client/server local area network or any known or later developed system for interconnecting multiple elements. Such networks include but are not limited to, for example, wide area networks, intranet, the Internet, or any other type of distributed network.

It should be understood in the block diagram of FIG. 1 that these elements, while depicted separately, are not necessarily separate and distinct components. Thus, the functions and/or operations of each element may be carried out by one or more elements.

The module assembly 120, as shown in FIG. 1, may be any item assembled as part of a manufacturing process. Assembly may include attachment of components or subassembly modules to a frame, for example, such as circuitry and hardware inserted and fastened to the frame of a computer CPU during assembly.

The power tool device 110, as shown in FIG. 1, may be any tool used for applying fasteners to modules during assembly. The assembly of modules may include use of fasteners such as screws, snap fits, and/or rivets. Examples of power tools that may be used include, but limited to, screwdrivers and riveters.

The sensor 112 may be any suitable sensing device that is capable of sensing a signal such as, for example, vibration, torque, displacement, capacitance, and/or electrical power current resulting from the assembly process. In various exemplary embodiments of this invention, the sensor 112 may comprise one or more sensors and may be mounted on the power tool device 110, a module assembly 120, or a combination of the two. The sensor 12 may comprise any suitable devices or arrangement of devices, either known or hereafter developed, such as, for example, accelerometers, strain gauges, micro-electro-mechanical system (MEMS) sensors, and/or contact sensors.

Figure 3:
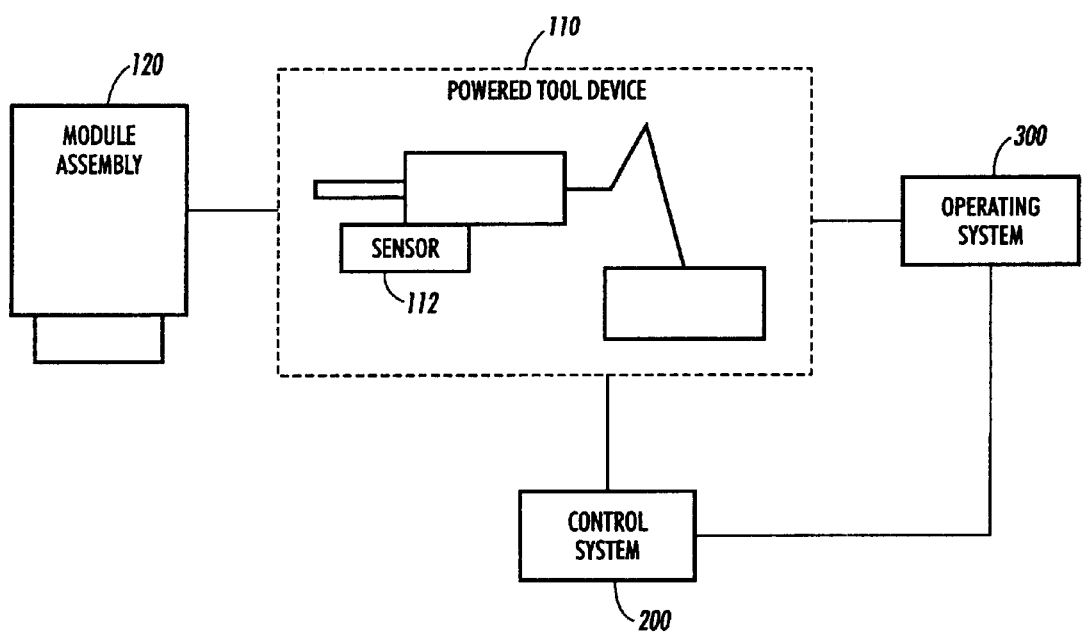
FIG. 3 is a schematic representation of an assembly system according to a second embodiment with a sensor mounted on a power tool device.

The sensor 112 is mounted to the power tool device 110 in a manner that will enable an accurate and unimpeded reading of the assembly process. Mounting of the sensor may be dependent on the type of power tool device used. It will be appreciated that the mounting of the sensor on a powered screwdriver will possibly differ from that of a powered riveter or other power tool device that may be used. If mounted on the power screwdriver, the sensor cable can be tie-wrapped to the power cord or air line to avoid damage. If attached to the module assembly 120 as depicted in FIG. 3, magnetic mounts are commonly used but any mounting method that allows unimpeded signal flow may be utilized.

As shown in FIG. 1, the sensor 112 attached to the power tool device 110 and/or the module assembly 120 is integrated through a network connection 114 with the control system 200 and the operating system 300. The control system 200 may be, but is not limited to, a control system typically used on a shop floor that tracks information relative to the operation of a factory. Further, the control system 200 may have specific information regarding the types of fasteners used in the assembly process. The control system 200 uses information from the sensor 112, such as, for example, duration, change, peak or overall waveform of the sensed signature characteristic, to assess the success of the fastening steps during the assembly process. The control system 200 thus provides a signal based on this information to the operating system 300 to initiate corrective action if necessary.

The operating system 300 of the integrated assembly system 100 provides an input to and enables the assembly process. The operating system 300 may comprise any suitable system, either known or hereafter developed, that is capable of conducting the assembly process, which may include operation of the powered tool device 110. For example, the operating system may comprise a factory worker, a computer, an automated system such as robotics, a semi-automated system and/or a combination of systems.

Figure 2:
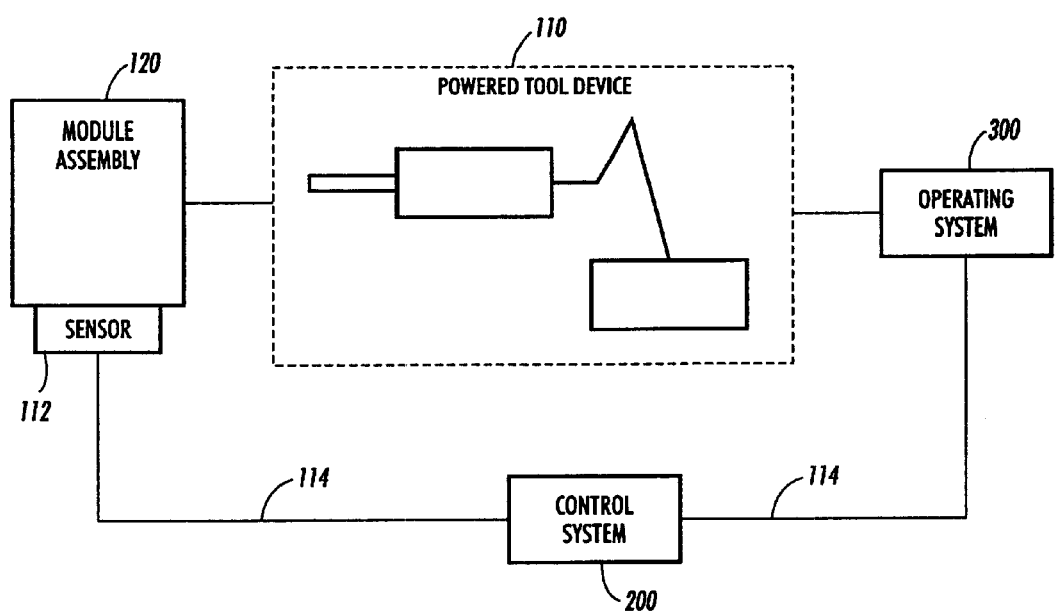
FIG. 2 is a schematic representation of an assembly system according to a first embodiment with the sensor mounted on a module assembly.

FIG. 2 shows a first embodiment of the power tool system 100 with the sensor 112 mounted on the module assembly 120. One or more sensors 112 may be mounted on the module assembly 120 by magnets, for example, but any mounting method that allows unimpeded signal flow may be used, including wireless transmitters. Suitable sensors include accelerometers, velocity sensors, or any other sensor that is capable of detecting vibration and/or electrical current.

As shown in FIG. 2, the sensor and/or sensors 112 on the module assembly 120 are connected to the control system 200 by way of a network interface. The sensed information is transmitted to the control system 200 for processing and analysis and, in turn, a signal or message is transmitted to the operating system 300. The signal or message may prompt the operator to assess the assembly process just completed or initiate build of the next assembly module.

The network connection 114 between the sensor or sensors 12 and the control system 200 or between the control system 200 and the operating system 300 may be any known or later developed device or system for connecting and integrating manufacturing systems, such as a shop floor control system. For example, the network connection 114 may comprise a direct cable connection, a connection over a wide area network or local area network, a connection over an intranet, a connection over the Internet, or a connection over any other distributed processing network or system, including wireless.

FIG. 3 shows a second embodiment of the power tool system 100 with the sensor 112 mounted to the power tool device 110. As shown in FIG. 2, the power tool device 110 is interfaced with the module assembly 120 and connected to the control system 200 by way of a network interface. The sensed information is transmitted to the control system 200 for processing and analysis and, in turn, a signal or message is transmitted to the operating system 300. The signal or message may prompt the operator to assess the assembly process just completed or initiate build of the next assembly module.

Figure 4:
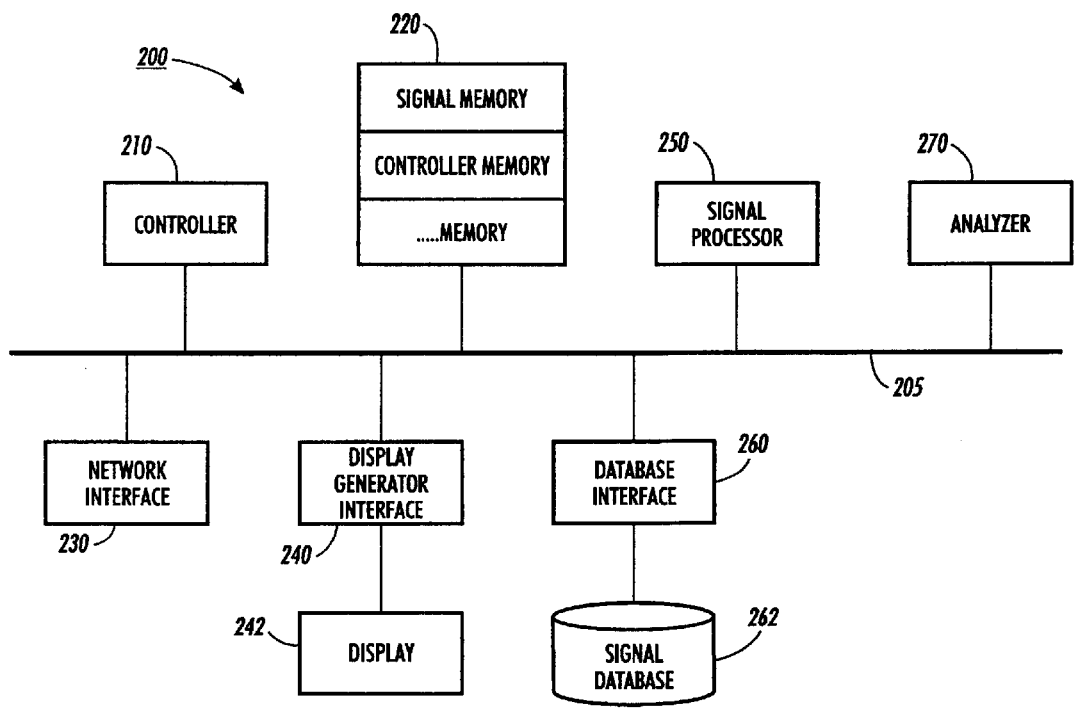
FIG. 4 is an exemplary block diagram of a control system for use with an intelligent assembly system according to this invention.

FIG. 4 shows an exemplary block diagram of the control system 200. This system incorporates a controller 210, memory 220, a network interface 230, a display generator interface 240, a signal processor 250, a database interface 260, and an analyzer 270. A display 242 is connected to the display generator interface 240. The database interface 260 interfaces with a database 262. All the elements may be connected together by a common bus 205. It should be appreciated that FIG. 4 shows the control system 200 with the various elements in a functional manner rather than a structural manner. It should also be appreciated in FIG. 4 that the control system 200 can be any known or later developed control system that enables the access, analysis, and distribution of data and/or information to operate an integrated system according to this invention.

The control system 200 may be implemented using a general purpose computer, but it should be appreciated that the control system can also be implemented on a special purpose computer, a programmed microprocessor or a micro-controller and peripheral integrated circuit elements, an application specific integrated circuit, or other integrated circuit, a hard-wired electronic or logic circuit such as a discrete element circuit, a programmable logic device such as a PLD, PLA, FPGA or PAL, or the like.

As shown in FIG. 4, the memory 220 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or rewritable optical disk and disk drive, a hard drive, flash memory or the like. Likewise, the non-alterable or fixed memory can be implemented using any one or more of ROM, PROM, EPROM, EEPROM, an optical disk ROM disk, such as a CD-ROM or DVD-ROM disk, and disk drive or the like.

The signal processor 250 may comprise any suitable method or device, either known or hereafter developed, that is capable of receiving and converting signals into a format usable by the control system 200. Examples of a signal processor 250 include digital signal processors or attached vector processors.

The analyzer 270 may comprise a software program that performs a comparative, quantitative analysis of the processed sensor signal from the fastener to stored specifications in the database 262. This includes, but is not limited to, a predetermined set of signature data for one or more fasteners. This data may include time-amplitude curves, sets of damping coefficients of natural frequencies, or any other unique signature data or parameter thresholds of the fastener being used. In addition, database 262 may contain electro-mechanical characteristics data relative to the power tool device 110 such as its torque displacement, shaft speed, motor current, capacitance or any other power tool parameter relative to the fastening process that may used in analysis. It is appreciated that other unique signatures of the fasteners may be identified and used in this database for comparative analysis. The analyzer 270 may be any commercially available comparative software package or any software package developed by the user and may be implemented, for example, using neural networks.

According to the second embodiment, the control system 200 receives the signal data from the sensor 112 and the power tool system 110 through the network interface 230. The signal is received and forwarded to the controller 210. The controller 210 relays the signal to the signal processor 250 for processing. The controller 210 transmits the processed data to the analyzer 270. The analyzer 270 then accesses the database 262 through the database interface 260 to analyze the data. The analyzer 270 may perform a quantitative analysis of a fastening process and assess the assembly operation data against stored parameters or readings. For example, the effective length of the screw may be determined from the vibratory signature sensed by the sensor. From the corresponding signature in the database 262 and the known electro-mechanical characteristics of the screw gun, such as speed and/or torque, a determination that the screw length is too long or too short may be made. The result may mean that the screw length was either wrong or that an incorrect number of washers was used. Additionally, the analyzer 270 may determine whether the correct number of screws were used, properly torqued, or correctly seated.

Figure 5:
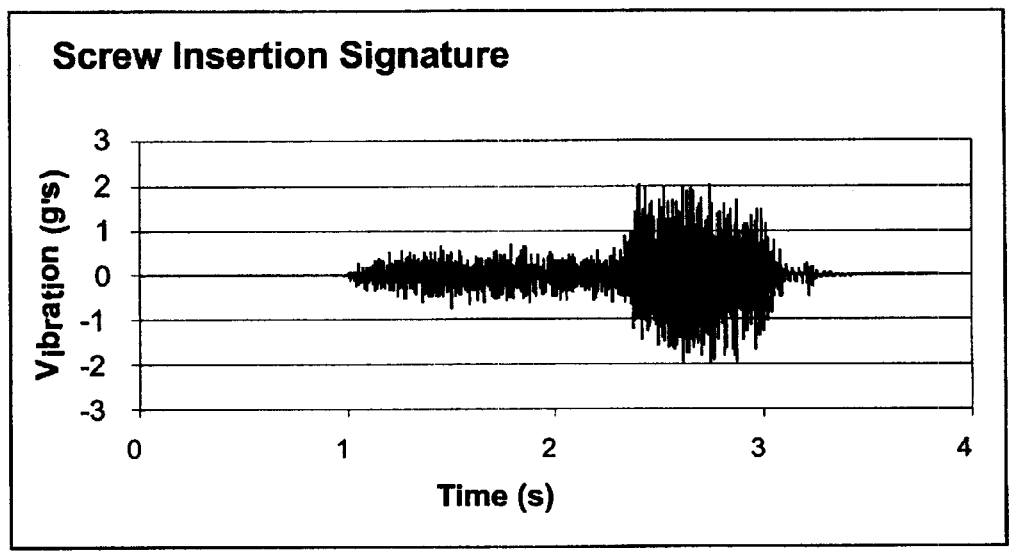
FIG. 5 is a vibration signature for a typical screw insertion.

An example is given in FIG. 5. FIG. 5 shows the vibration signature for a typical screw insertion. As depicted, the operation begins at approximately one second. The screw bottoms out at approximately 2.5 seconds. This unique signature may be compared to the signature stored in the database 262 to assess the fastening step.

In the control system 200, the controller 210 may provide the result to the display 242 via the display generator interface 240. The display 242 may comprise any user interface system currently available or later developed that provides an indication of the results of the analysis, for example a graphical display or an audible signal.

Upon completion of the analysis, the controller 210 may transmit the results of the analysis to the operating system 300 via the network interface 230. The control system 200 may also receive information back from the operating system 300, indicating a response action to the signal transmitted by the control system 200. For example, it may be necessary to track assembly delays associated with actions of the operating systems 300, especially in a shop floor control environment.

Figure 6:
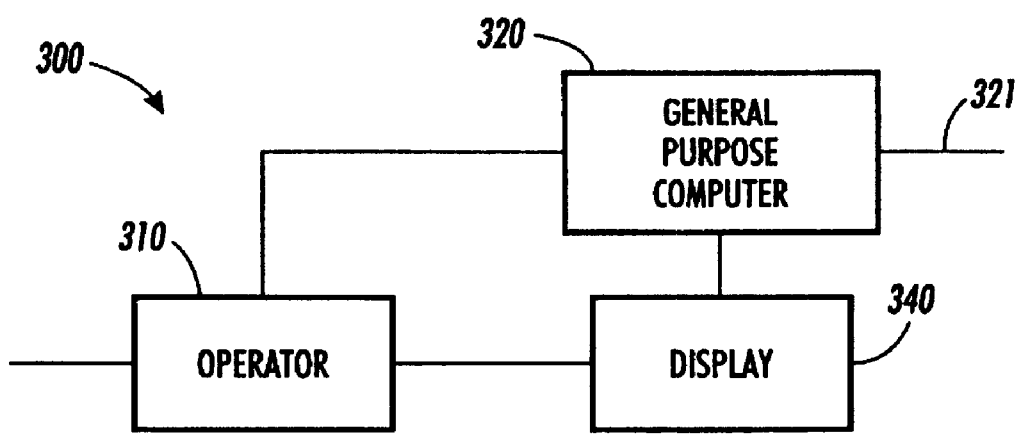
FIG. 6 is an exemplary block diagram of an operating system for use with an intelligent assembly system according to this invention.

FIG. 6 is an exemplary block diagram representation of the operating system 300. As shown, the operating system 300 comprises an operator 310 and a general purpose computer 320. The general purpose computer 320 is interfaced with a display 340 to communicate analysis results from the control system 200 to the operator 310.

The operator 310 may comprise a worker on the shop floor performing the assembly procedure. The operator 310 may also comprise any automated or semi-automated system capabilities, either known or hereafter developed. For example, in the case of robotics in a fully automated system, the operator 310 may be a machine capable of reacting to the information provided by the control system 200 and capable of operating directly with the power tool device 110. Further, the operator 310 may comprise both a worker and a machine. For example, even though robotics may be used in the assembly process, a worker may still be required to initiate and/or initiate control operation of the machine.

The general purpose computer 320 may be networked into the intelligent assembly system 100 as shown in FIG. 6. The general purpose computer 320 may also be implemented as a special purpose computer, a programmed microprocessor or micro-controller and peripheral circuit elements, an ASIC or other integrated circuit, a hardwired electronic or logic circuit such as a discrete element circuit, a programmable logic device such as a PLD, PLA, FPGA or PAL, or the like.

Figure 7:
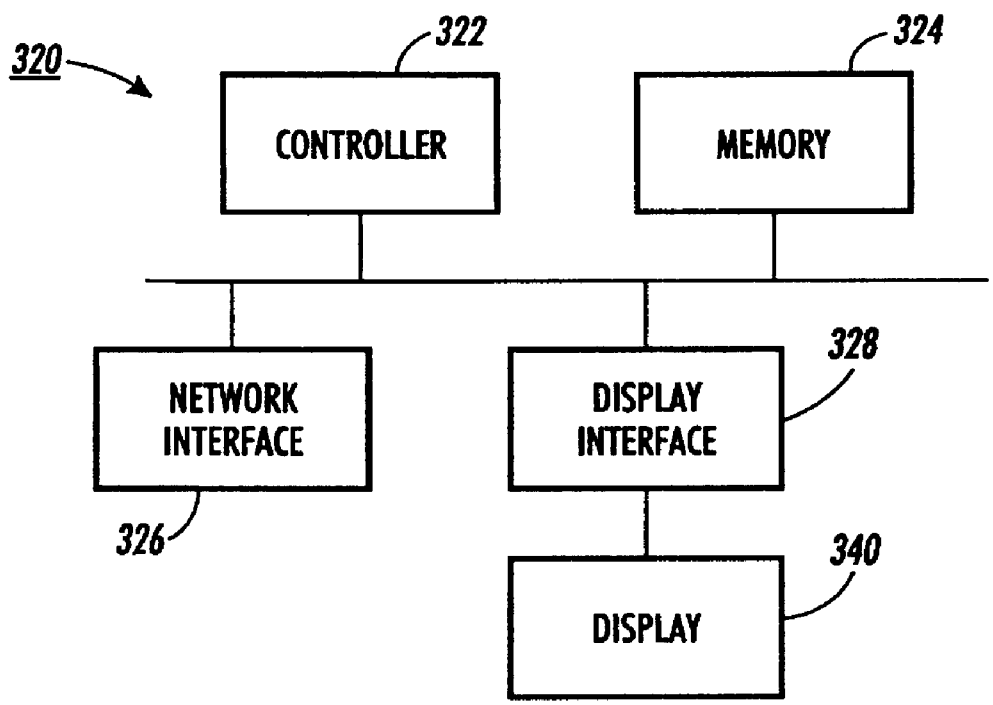
FIG. 7 is an exemplary block diagram of a general purpose computer.

In FIG. 7, the general purpose computer 320, comprises a controller 322, memory 324, a display interface 328, and a network interface 326. The elements are connected by a common bus 321. The display 340 in FIG. 7 is connected to the general purpose computer 320 through the display generator interface 328. The display 340 may be a touch screen or any other means for relaying information to the operator 310 such as a flashing light or an audible indicator.

The operating system 300 receives the signal from the control system 200 through the network interface 326 in FIG. 7. The controller 322 transmits the signal to the display interface 328 for action by the operator 310.

Figure 8:
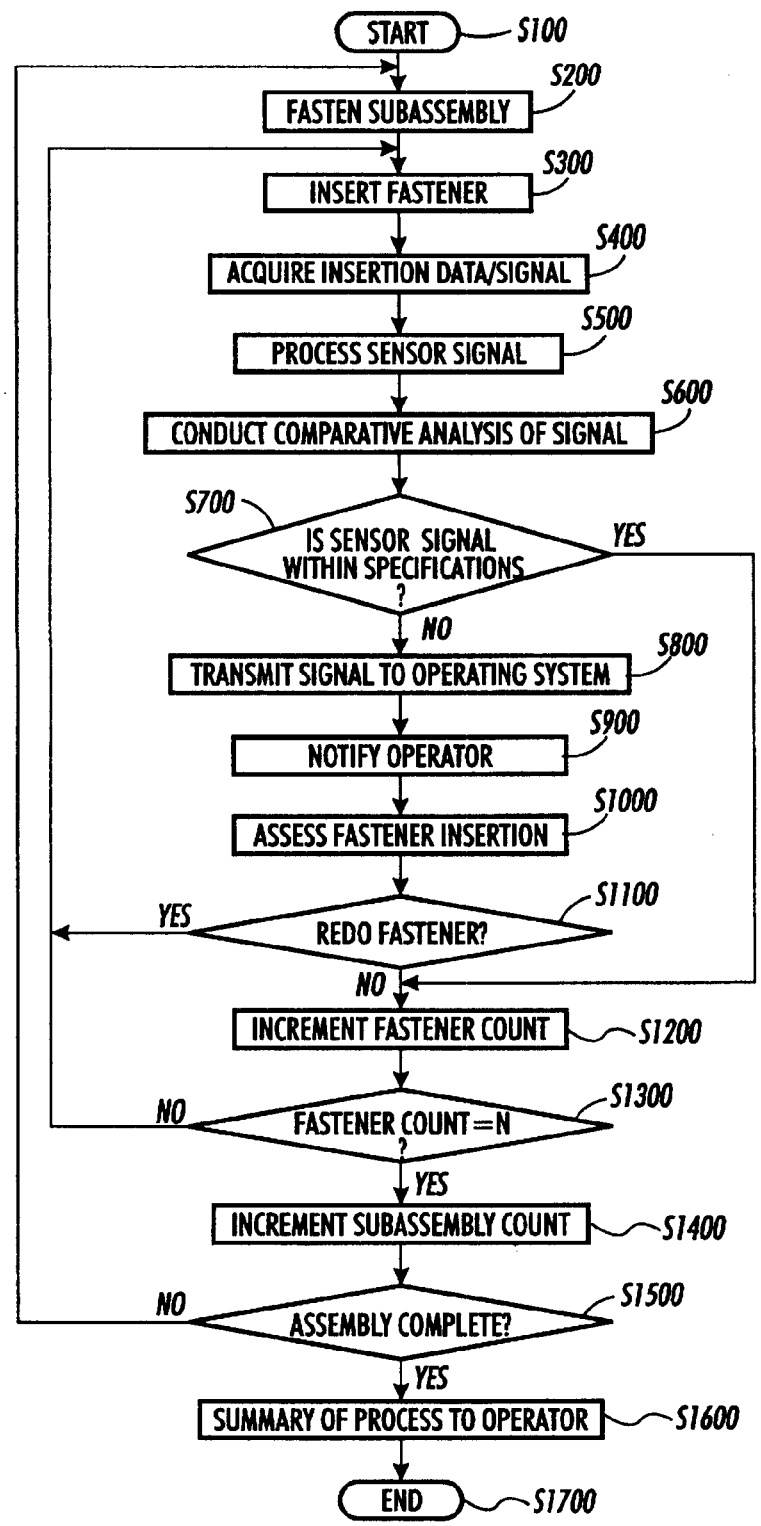
FIG. 8 is an exemplary flowchart illustrating a first embodiment of a method of using an intelligent assembly according to this invention.

FIG. 8 shows an exemplary flowchart for the method of using the intelligent assembly system 100 of this invention in assembly of a module using fasteners with one or more sensors 112 mounted on the module assembly 120. As shown, control begins at step S100. At step S200, a component or subassembly is fastened to the module. Control continues to step S300, where a fastener is inserted. Next, in step S400, the sensor data is acquired by the signal processor. Then, in step S500, the sensor data is processed by the signal processor 250. At step S600, a comparative analysis is executed using the analyzer 270. The analyzer 270 accesses the data in the database 262 to conduct the analysis. In step S700, a determination is made whether or not the processed sensor data indicates an insertion that is within an expected or known threshold or range of predetermined data specifications.

If the sensor data is not within specifications, control continues to step S800, otherwise control jumps to step S1200. In step S800, a signal is transmitted to the operating system 300. In step S900, the operator 310 is notified of the results of the comparative analysis. Control then continues to step S1000 where the operator 310 may assess the subassembly and the insertion. Control then continues to step S1100 where a determination whether to redo the insertion of the fastener is made. If the subassembly and the insertion are fine and do not need to be redone, control continues to step S1200, otherwise control returns to step S300.

In step S1200, a count of the fasteners is made and reported to the operator 310. This information may be used, in step S1300, to determine whether or not a required number N of fasteners have been inserted. If the required number N has not been inserted, control returns to step S300. If the required number N has been inserted, control continues to step S1400 where a count of the subassembly components is made and reported to the operator 310. This information may be used, in step S1500, to determine whether or not the assembly process is completed. If completed, control continues to step S1600 where a summary of the assembly process is transmitted to the operator 310. If not completed, control returns to step S200. The process ends at step S1700.

Figure 9:
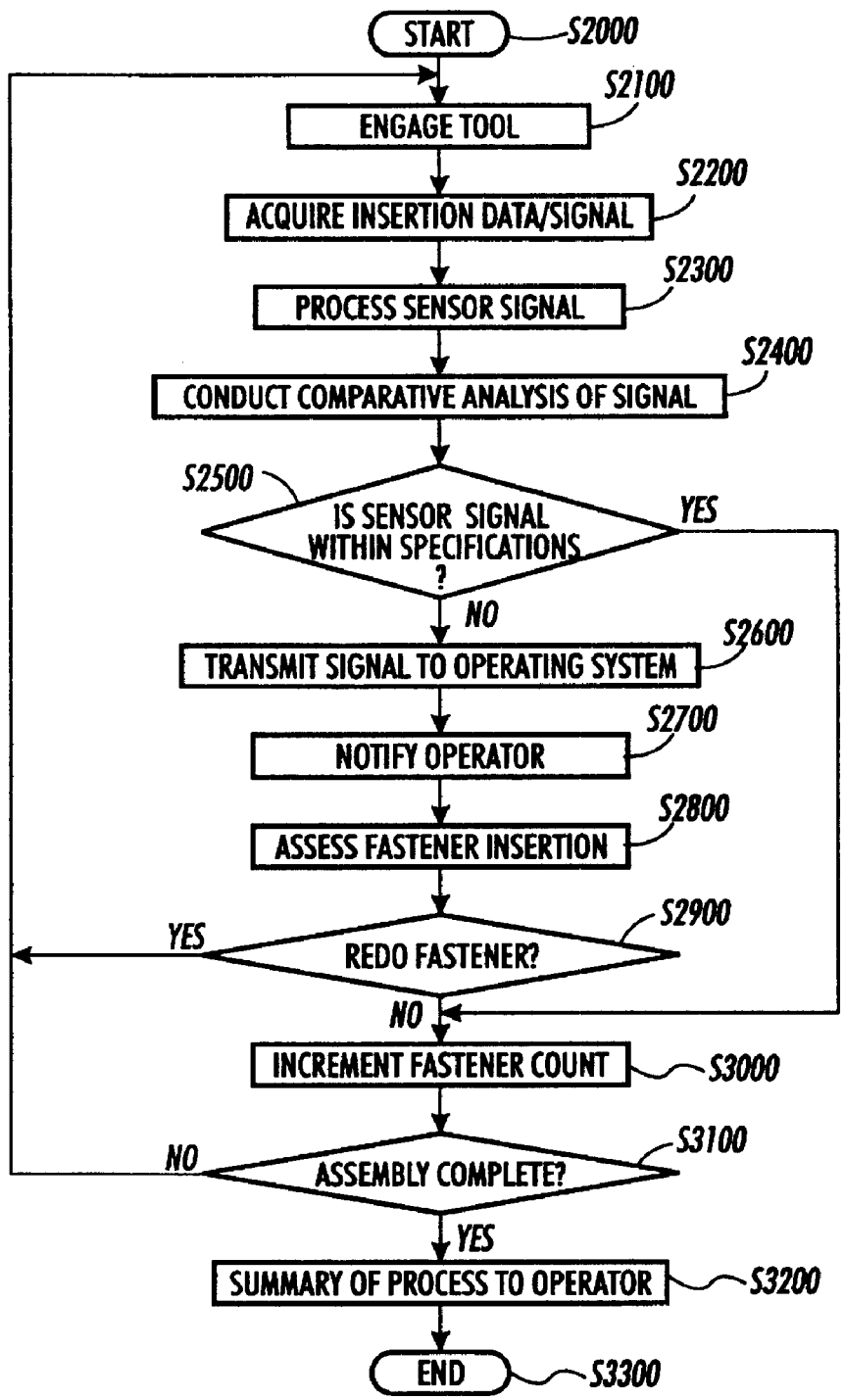
FIG. 9 is an exemplary flowchart illustrating a second embodiment of a method of using an intelligent assembly according to this invention.

FIG. 9 shows an exemplary flow chart for the method of using the intelligent assembly system 100 of this invention in assembly of a module using fasteners with one or more sensors 112 mounted on the powered tool device 110.

Control begins at step S2000 and continues to step S2100 where the powered tool device 110 is engaged with a fastener. Control continues to step S2200 where the sensor or sensors 112 attached to the powered tool device 10 read data from the fastening process. Next, in step S2300, a sensor signal is processed by the control system 200. At step S2400, a comparative analysis of the sensor signal is conducted. Control continues to step S2500 where a determination is made whether or not the signal is within specifications.

If the signal is not within specification, control continues to step S2600, otherwise control jumps to step S3000. In step S2600, a signal is transmitted to the operating system 300. In step S2700, the operator 310 is notified of the results of the comparative analysis of the fastening process. Control then continues to step S2800 where the operator 310 may assess the fastener. Control then continues to step S2900 where a determination whether to redo the fastener is made. If the fastener is fine and does not need to be redone, control continues to step S3000, otherwise control goes back to step S2100 where the fastening process is reinitiated.

In step S3000, the fastener count is incremented after each fastener is deemed within expected specifications. This information may be used, in step S3100, to determine whether or not the fastening process is completed. If completed, control continues to step 3200 where a summary of the fastening process is transmitted to the operator 310. The process ends at step S3300.

According to a third exemplary embodiment of this invention, a power tool device 400 is not connected to a control system, but functions as a stand-alone device for intelligent assembly. The stand-alone power tool device 400 utilizes the signature analysis principles described above to determine the quality and extent of a fastener insertion. However, the overall assembly process is not monitored by the power tool device 400. The power tool device 400 provides feedback for individual fastener insertions.

As shown in FIG. 10, the power tool device 400 may include a user input 420, for example, a rotary switch or any suitable device that enables a user to select a single value from a predetermined list of values stored in a memory 410 of the power tool device 400. The predetermined list of values may be a list of standard fastener lengths, for example, such as quarter-inch, half-inch, three-quarter-inch, etc.

The single value selected by the user via the user input 420 designates a target value for a characteristic signature of the power tool device 400 when performing an insertion. The user input 420 communicates the single value to a micro-controller 430 of the power tool device 400. The micro-controller 430 then determines the target value based on the received single value.

The power tool device 400 includes one or more sensors 440 that sense a signature characteristic of the power tool device 400 during an insertion. For example, the sensed signature characteristic may be an electrical current or a mechanical vibration of the power tool device 400.

For each insertion performed by the power tool device 400, the micro-controller 430 receives the signature characteristic sensed by the sensor(s) 440 and compares its value to the target value. If the signature characteristic is within an acceptable range of the target value, the micro-controller 430 can output a signal to notify the user that the insertion is successful. For example, the power tool device 400 may include an output device 450 that notifies the user upon receiving the output signal from the micro-controller 430.

The output device 450 may comprise any suitable device that is capable of notifying the user. For example, a speaker that emits an audible tone, a visual indicator such as an LED or any other known or hereafter developed device may be used. Additionally or alternatively, the micro-controller 430 can output a signal to notify the user that the insertion is not successful.

When both successful and unsuccessful insertions are communicated to the user by the power tool device 400, a different audible tone or a different color visual indicator, for example, may be actuated by different signals output by the micro-controller 430 corresponding to successful and unsuccessful insertions, respectively. These examples are not exclusive or exhaustive. As such, it should be understood that various outputs and combinations of outputs are contemplated, depending on the user's preferences.

The power tool device 400 may also include a second user input 422 for providing more details of the fastener. For example, when the fastener is a screw, the second user input 422 may comprise another rotary switch or other suitable device that enables a user to select a thread type, such as fine, medium or coarse. This additional information enables the power tool device 400 to determine whether or not an insertion is complete and/or satisfactory with a higher degree of accuracy.

While this invention has been described in conjunction with specific embodiments thereof, it is evident that many alternatives, modifications and variations will be apparent to those skilled in the art. Therefore, exemplary embodiments of the invention as set forth herein are intended to be illustrative and not limiting. Various changes may be made without departing from the spirit and scope of the invention.

What is claimed is:

1. A method for intelligent assembly, the method comprising the steps of:
   inserting a fastener into an assembly;
   sensing a signature characteristic of the insertion of the fastener;
   evaluating the insertion of the fastener using the sensed signature characteristic;
   wherein the evaluating step comprises:
      counting a number of a plurality of insertions for at least one of an assembly process step and an entire assembly process;
      comparing the counted number of a plurality of insertions with a desired number of plurality of insertions; and
      determining whether the desired number of a plurality of insertions is made.

2. The method of claim 1, further comprising transmitting a result based on the evaluation of the insertion of the fastener.

3. The method of claim 2, further comprising displaying the transmitted result.

4. The method of claim 1, wherein the signature characteristic is a vibratory signature.

5. The method of claim 1, wherein the signature characteristic is an electrical signature.

6. The method of claim 1, wherein the evaluating step comprises determining whether the insertion of the fastener is a complete insertion.

7. The method of claim 1, wherein the evaluating step further comprises determining at least one of whether desired length fastener is used, whether a desired number of a plurality of washers is used and whether a desired thickness of washers is used.

8. The method of claim 1, wherein the evaluation of the insertion of the fastener comprises comparing the signature characteristic to a predetermined signature characteristic.

9. The method of claim 8, wherein the comparing step comprises:
   accessing a database of predetermined signature characteristics; and
   determining whether the signature characteristic of the insertion of the fastener is a sufficient match to one of the predetermined signature characteristics of the database.

10. The method of claim 9, further comprising creating the database of predetermined signature characteristics based on the assembly process.

11. An intelligent assembly system, comprising:
   at least two parts to be assembled through insertion of at least one fastener;
   at least one sensor associated with at least one of the parts to be assembled and arranged to sense a signature characteristic of the insertion of the fastener; and
   a processor that evaluates the insertion of the fastener based on the sensed signature characteristic;
   wherein the at least one sensor is at least temporarily mounted directly on at least one of the parts.

12. The system of claim 11, further comprising a shop floor control in communication with the processor.

* * * * *